United States Patent
Peters

(10) Patent No.: US 10,041,444 B2
(45) Date of Patent: Aug. 7, 2018

(54) VARIABLE ORIFICE JET FOR A TURBINE ENGINE

(71) Applicant: United Technologies Corporation, Hartford, CT (US)

(72) Inventor: Donald W. Peters, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 312 days.

(21) Appl. No.: 14/842,246

(22) Filed: Sep. 1, 2015

(65) Prior Publication Data

US 2016/0069298 A1 Mar. 10, 2016

Related U.S. Application Data

(60) Provisional application No. 62/046,497, filed on Sep. 5, 2014.

(51) Int. Cl.
| | | |
|---|---|---|
| *F23R 3/20* | (2006.01) | |
| *F02K 3/10* | (2006.01) | |
| *F02C 7/22* | (2006.01) | |
| *F23D 11/38* | (2006.01) | |

(52) U.S. Cl.
CPC ............... *F02K 3/10* (2013.01); *F02C 7/222* (2013.01); *F23D 11/38* (2013.01); *F23R 3/20* (2013.01)

(58) Field of Classification Search
CPC ........ F23R 3/20; F02M 63/028; F02M 61/06; F02M 63/047; F23D 11/26; B05B 12/088; F02K 3/10; F02K 3/105; F02C 7/228
See application file for complete search history.

(56) References Cited

U.S. PATENT DOCUMENTS

| | | | | |
|---|---|---|---|---|
| 2,626,187 | A | | 1/1953 | Heinrich |
| 2,755,133 | A | * | 7/1956 | Conrad ...................... F23R 3/28 |
| | | | | 137/528 |
| 2,965,311 | A | * | 12/1960 | Gascoigne .............. B05B 7/066 |
| | | | | 239/403 |
| 2,978,870 | A | | 4/1961 | Vdoviak |
| 3,301,492 | A | | 1/1967 | Kingsley |
| 3,406,910 | A | | 10/1968 | Simmons |
| 3,527,056 | A | | 9/1970 | Hoffman |
| 3,698,186 | A | * | 10/1972 | Beane ....................... F23R 3/00 |
| | | | | 60/746 |
| 3,827,638 | A | * | 8/1974 | Halvorsen ............ B23K 1/0008 |
| | | | | 239/533.13 |
| 3,871,063 | A | * | 3/1975 | Halvorsen ............ B23K 1/0008 |
| | | | | 228/135 |

(Continued)

FOREIGN PATENT DOCUMENTS

| | | |
|---|---|---|
| GB | 768969 | 2/1957 |
| GB | 857725 | 1/1961 |

OTHER PUBLICATIONS

EP Search Report dated Jan. 21, 2016.

*Primary Examiner* — Gerald L Sung
*Assistant Examiner* — Rene Ford
(74) *Attorney, Agent, or Firm* — O'Shea Getz P.C.

(57) ABSTRACT

A fuel delivery system is provided for a turbine engine. This fuel delivery system includes a variable orifice jet configured to spray fuel received from a spray bar fuel conduit. The variable orifice jet includes a flexible body and a pintle that extends through a sidewall of the flexible body. An area of an orifice between the sidewall and the pintle is variable.

20 Claims, 7 Drawing Sheets

(56) References Cited

U.S. PATENT DOCUMENTS

| | | | |
|---|---|---|---|
| 4,421,475 A * | 12/1983 | Frick | F23D 11/445 |
| | | | 431/207 |
| 4,765,136 A | 8/1988 | Clements et al. | |
| 4,841,725 A * | 6/1989 | Farris | F23D 11/24 |
| | | | 239/533.12 |
| 5,685,140 A | 11/1997 | Clements et al. | |
| 5,685,142 A | 11/1997 | Brewer et al. | |
| 7,647,775 B2 | 1/2010 | Muldoon et al. | |
| 8,123,228 B2 | 2/2012 | Muldoon et al. | |
| 8,235,345 B2 | 8/2012 | Sadil et al. | |
| 8,534,071 B1 | 9/2013 | Lovett et al. | |
| 2012/0073301 A1* | 3/2012 | Paradise | F02C 7/228 |
| | | | 60/746 |
| 2013/0091849 A1 | 4/2013 | Sadil et al. | |
| 2013/0139512 A1 | 6/2013 | Sadil et al. | |
| 2014/0060059 A1* | 3/2014 | Brogan | F23R 3/28 |
| | | | 60/740 |

* cited by examiner

VARIABLE ORIFICE JET FOR A TURBINE ENGINE

This application claims priority to U.S. patent application Ser. No. 62/046,497 filed Sep. 5, 2014.

BACKGROUND OF THE INVENTION

1. Technical Field

This disclosure relates generally to a turbine engine and, more particularly, to a fuel delivery system for a turbine engine.

2. Background Information

A turbine engine may include an augmentor section for boosting engine thrust during certain operating conditions and/or maneuvers. Such an augmentor section includes a plurality of fuel jets (also referred to as "fuel injectors"), which are arranged to inject fuel into core air exiting a turbine section of the engine. These fuel jets are intended to direct the injected fuel relatively deep into the core air to facilitate mixing of the fuel with the core air. Under certain condition, however, fuel pressure within a manifold supplying the fuel to the fuel jets may be relatively low. With such low fuel pressure, the fuel may not be injected as intended. For example, the injected fuel may not travel deep enough into the core gas to facilitate ideal and/or sufficient mixing. There also may not be sufficient fuel pressure to facilitate fuel atomization during injection.

There is a need in the art therefore for an improved fuel jet that can account for fuel pressure variations.

SUMMARY OF THE DISCLOSURE

According to an aspect of the invention, a fuel delivery system is provided for a turbine engine. This fuel delivery system includes a variable orifice jet configured to spray fuel received from a spray bar fuel conduit. The variable orifice jet includes a flexible body and a pintle that extends through a sidewall of the flexible body. An area of an orifice between the sidewall and the pintle is variable.

According to another aspect of the invention, another fuel delivery system is provided for a turbine engine. This fuel delivery system includes a variable orifice jet attached to and fluidly coupled with a fuel conduit. The variable orifice jet includes a pintle and a flexible body with a bellows. The pintle extends through a sidewall of the flexible body. An area of an orifice between the sidewall and the pintle is variable.

The variable orifice jet may be configured to change the area of the orifice as fuel pressure within the flexible body changes. For example, the variable orifice jet may be configured to increase the area of the orifice as fuel pressure within the flexible body increases. The variable orifice jet may be configured to decrease the area of the orifice as fuel pressure within the flexible body decreases.

A portion of the pintle that extends through the sidewall may be tapered towards a distal end of the pintle.

The pintle may include a head at the distal end. The head may be configured to redirect fuel flowing axially through the orifice at least partially radially outward.

An annular surface of the sidewall forming an outer periphery of the orifice may taper towards the distal end of the pintle.

The flexible body may be configured as or otherwise include a single chamber bellows.

The flexible body may be configured as or otherwise include a multi-chamber bellows.

The flexible body may be generally tubular and substantially co-axial with the pintle.

A second variable orifice jet may be included and configured to spray fuel received from the fuel conduit.

A fixed orifice jet may be included and configured to spray fuel received from the fuel conduit.

An augmentor vane may be included. The fuel conduit and the variable orifice jet may be configured with the augmentor vane.

The variable orifice jet may be configured to change the area of the orifice as fuel pressure within the bellows changes.

The fuel conduit may extend radially relative to a centerline of the turbine engine.

The fuel conduit may extend circumferentially at least partially about a centerline of the turbine engine.

The fuel delivery system and its components may be configured for an augmentor section of a turbine engine, a combustor section of a turbine engine, or any other section or system of a turbine engine.

The foregoing features and the operation of the invention will become more apparent in light of the following description and the accompanying drawings.

DETAILED DESCRIPTION OF THE INVENTION

Figure 1:
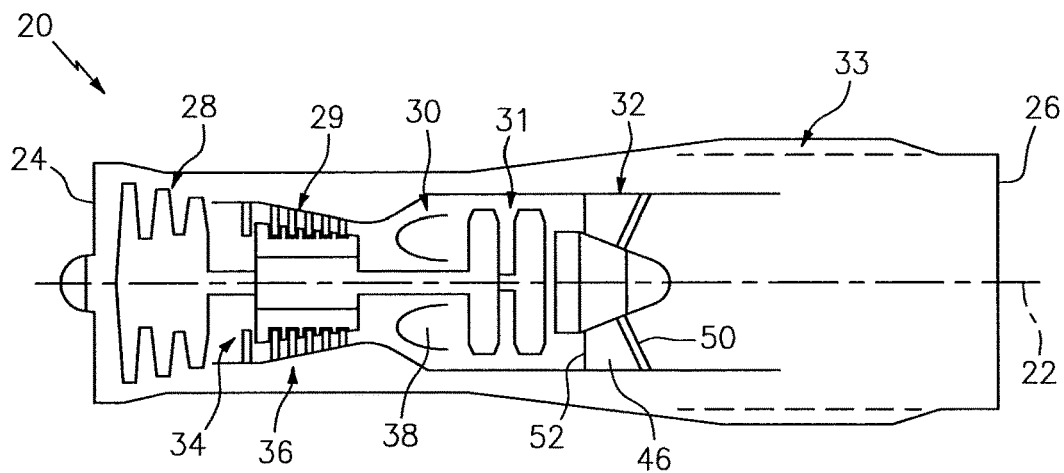
FIG. 1 is a schematic sectional illustration of a turbine engine.

FIG. 1 illustrates a turbine engine 20 extending along an axial centerline 22 between an upstream airflow inlet 24 and a downstream airflow exhaust 26. This turbine engine 20 includes a fan section 28, a compressor section 29, a combustor section 30, a turbine section 31, an augmentor section 32 and a nozzle section 33. These engine sections 28-33 are arranged sequentially along the centerline 22 within an engine housing.

During operation, air enters the turbine engine 20 through the airflow inlet 24, and is directed through the fan section 28 into a core gas path 34 and a bypass gas path 36. The air within the core gas path 34 may be referred to as "core air". The air within the bypass gas path 36 may be referred to as "bypass air". The core air is directed through the engine sections 29-33, and exits the turbine engine 20 through the airflow exhaust 26 to provide forward engine thrust. Within the combustor section 30, fuel is injected into a combustion chamber 38 and mixed with the core air. This fuel-core air mixture is ignited to power the turbine section 31. Additional fuel may be selectively injected into the core gas path 34 within the augmentor section 32 to boost (i.e., increase) the forward engine thrust. The bypass air may be utilized to cool various turbine engine components. The bypass air may also or alternatively be utilized to provide additional forward engine thrust, or diverted through a thrust reverser (not shown) to provide reverse engine thrust.

Figure 2:
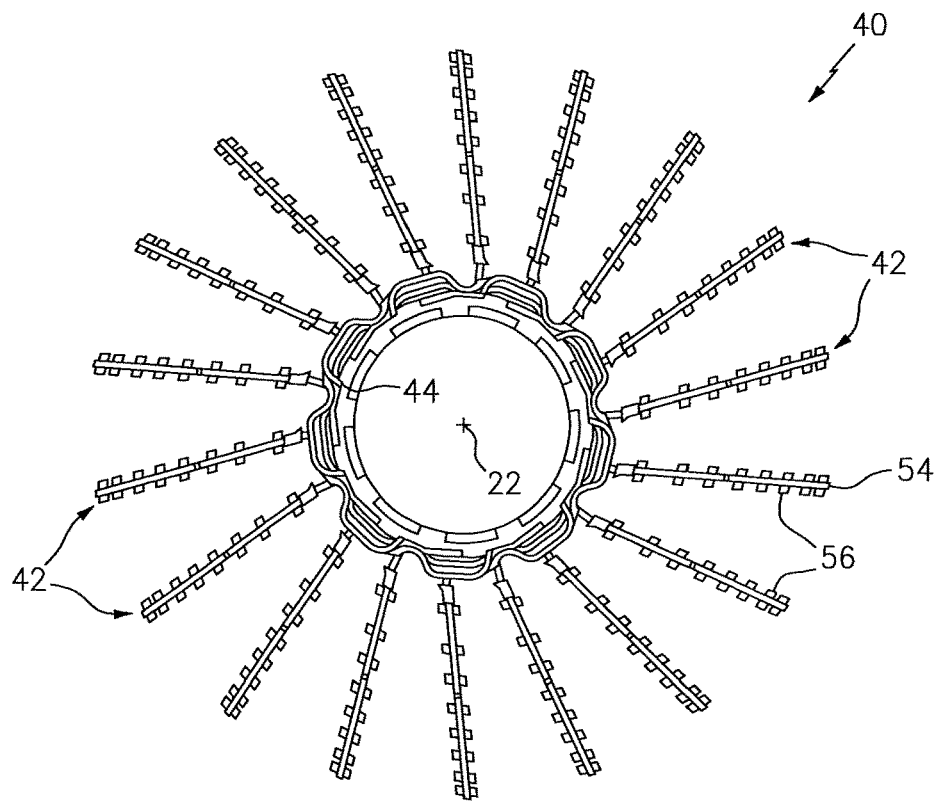
FIG. 2 is an illustration of a fuel delivery system for the turbine engine of FIG. 1.

FIG. 2 illustrates a fuel delivery system 40 for the augmentor section 32 of FIG. 1. This fuel delivery system 40 includes one or more spray bars 42 and a fuel delivery manifold 44 that distributes fuel to the spray bars 42. The spray bars 42 may be arranged circumferentially about (or within) the fuel delivery manifold 44. Referring to FIGS. 1 and 2, each of the spray bars 42 is arranged with a respective augmentor vane 46. Each of the spray bars 42, for example, may extend radially into an inner cavity of a trailing edge box 50 connected to an upstream vane portion 52.

Figure 3:
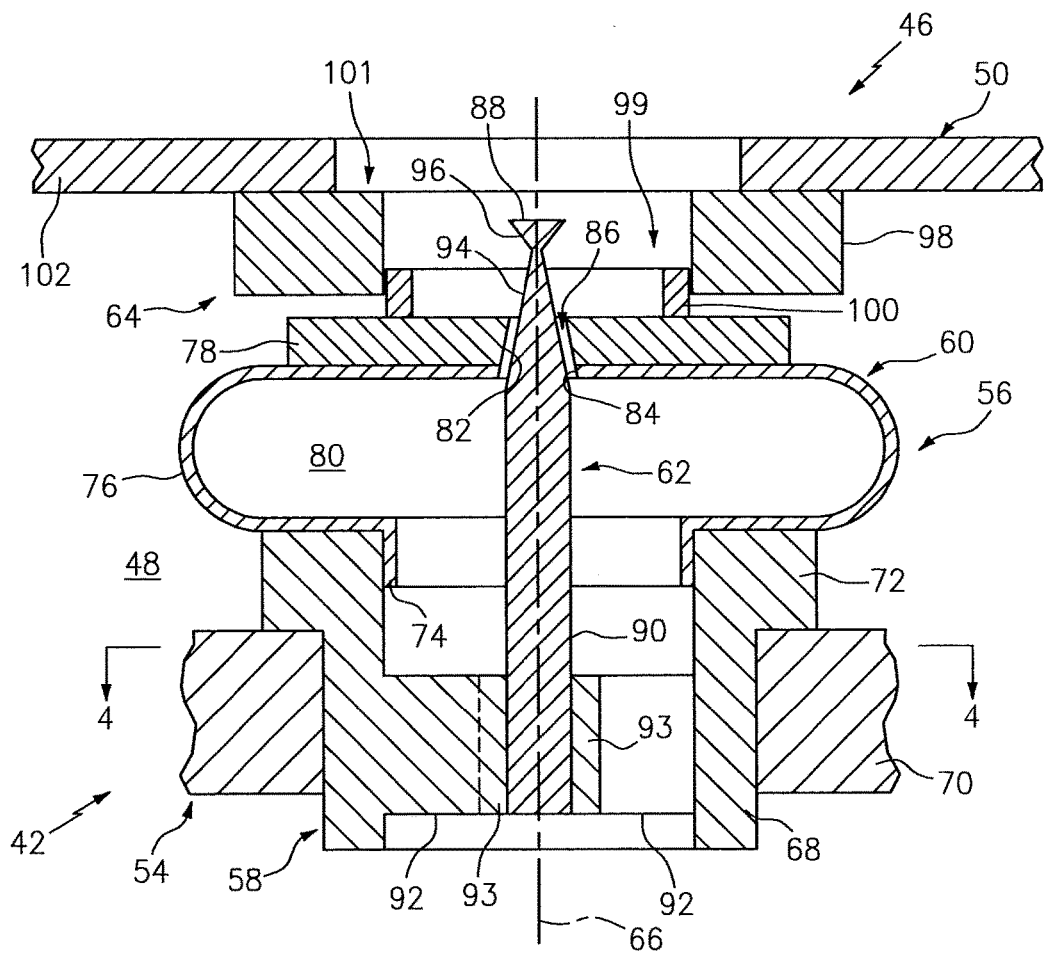
FIG. 3 is a side sectional illustration of a portion of the spray bar and a trailing edge box.
Figure 4:
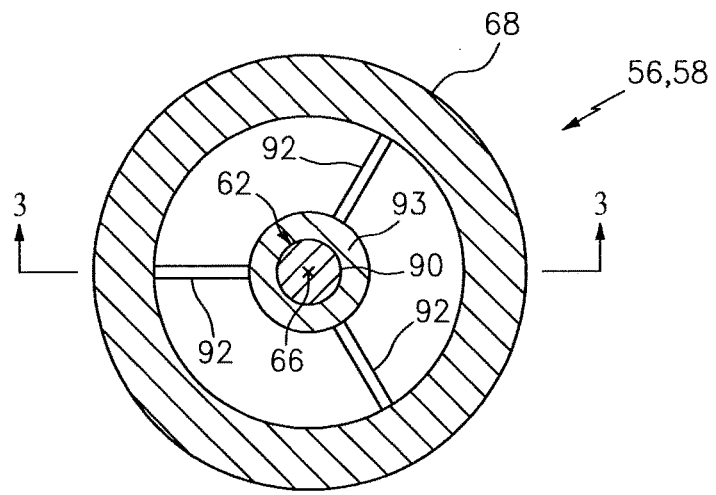
FIG. 4 is a cross-sectional illustration of a variable orifice jet.
Figure 5:
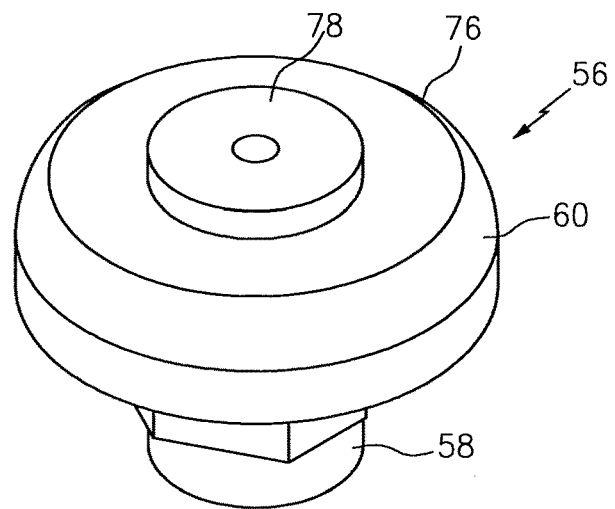
FIG. 5 is a partial perspective illustration of the variable orifice jet.

FIG. 3 illustrates a portion of an exemplary embodiment of one of the spray bars 42 within the inner cavity of a respective one of the augmentor vanes 46. This spray bar 42 includes at least one tubular spray bar fuel conduit 54 (e.g., a length of augmentor or combustor section hose or pipe) and one or more variable orifice jets 56, one of which is illustrated in FIG. 3. Referring to FIGS. 3-5, each variable orifice jet 56 includes a jet base 58, a flexible body 60, a pintle 62 and a seal assembly 64.

The base 58 has a tubular sidewall that extends along an axis 66, and may be substantially co-axial with one or more or each of the other jet components 60, 62 and/or 64. The base 58 is configured to attach the variable orifice jet 56 to the fuel conduit 54. The base 58 of FIG. 3, for example, includes a threaded portion 68 which is received within a tapped hole in a tubular sidewall 70 of the fuel conduit 54. In this manner, the base 58 fluidly couples the variable orifice jet 56 to the fuel conduit 54. The base 58 of FIG. 3 also includes a grip portion 72 (e.g., a hexagonal portion) configured to be received by a tool (e.g., a wrench) for installation and removal of the variable orifice jet 56. Of course, the base 58 may also or alternatively be welded, braised, adhered and/or otherwise bonded to the fuel conduit sidewall 70.

The flexible body 60 is attached to the base 58. The flexible body 60 of FIG. 3, for example, includes an annular lip 74 received within a bore of the base 58. This annular lip 74 may be threaded and mated with an inner threaded portion of the base 58. Alternatively, the annular lip 74 and/or another portion of the flexible body 60 may be press-fit and/or bonded to the base 58. Still alternatively, the flexible body 60 may be formed integral with the base 58; e.g., formed as a single unit.

Figure 8:
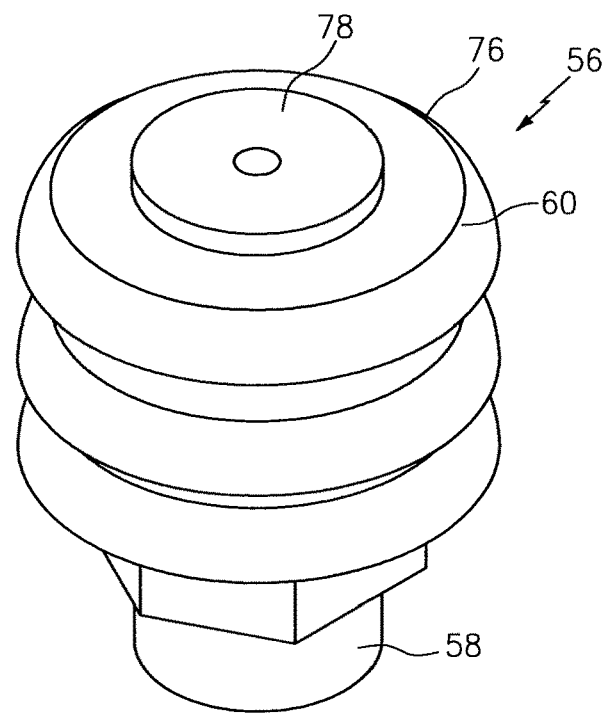
FIG. 8 is a partial perspective illustration of another variable orifice jet.
Figure 6:
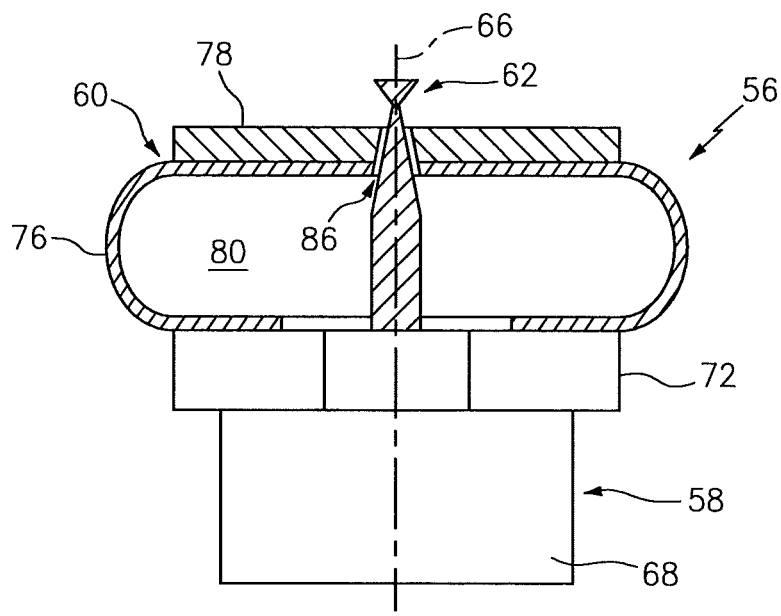
FIG. 6 is a side cutaway illustration of the variable orifice jet where fuel pressure within the jet is relatively low.
Figure 7:
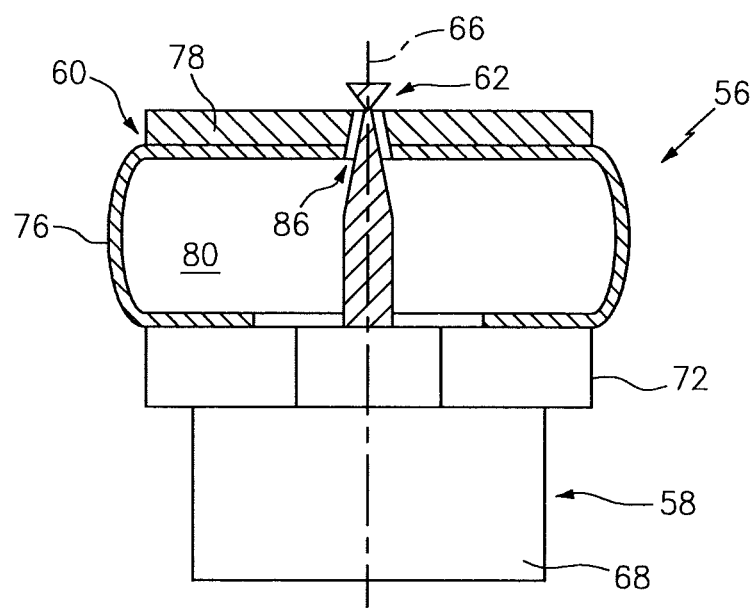
FIG. 7 is a side cutaway illustration of the variable orifice jet where fuel pressure within the jet is relatively high.

The flexible body 60 also includes a variable volume member 76 and a nozzle member 78; e.g., a nozzle plate. The variable volume member 76 is generally tubular and extends along the axis 66 from the annular lip 74 to the nozzle member 78. The variable volume member 76 is configured with an internal volume 80 that changes based on pressure of fuel contained within the variable volume member 76. More particularly, the variable volume member 76 is configured to axially (relative to the axis 66) elongate and contract as fuel pressure therewithin respectively increases and decreases as illustrated in FIGS. 6 and 7. An example of the variable volume member 76 is a bellows, which may be a single chamber bellows as illustrated in FIGS. 3 and 5 or a multi-chamber bellows as illustrated in FIG. 8. Such a bellows may be constructed from resilient metal and/or any other materials with a configuration (e.g., shape) designed to promote movement along the axis 66. Of course, various other bellow configurations are known in the art and the present disclosure is not limited to any particular ones thereof.

Referring to FIG. 3, the nozzle member 78 may be discrete from the variable volume member 76 and attached (e.g., bonded) thereto. Alternatively, the nozzle member 78 may be formed integral with the variable volume member 76; e.g., a thick end cap of the bellows. The nozzle member 78 includes a conical surface 82. This surface 82 is aligned with a conical surface 84 of the variable volume member 76, and together the conical surfaces 82 and 84 form an outer periphery of an orifice 86 through a sidewall of the flexible body 60. Each of the surfaces 82 and 84 is tapered towards a distal end 88 of the pintle 62; e.g., away from the annular lip 74.

The pintle 62 extends along the axis 66 from a base portion 90 to its distal end 88. The base portion 90 may be attached to the base 58 sidewall by one or more struts 92 (see also FIG. 4). For example, the base portion 90 may be received within a tapped hole in a mounting ring 93, where the struts 92 connect the mounting ring 93 to the base 58. In this manner, the relative axial height of the pintle 62 may be changed to adjust the size of the orifice 86 as discussed below in further detail. A tapered portion 94 of the pintle 62 is axially aligned with the tapered surfaces 82 and 84 and defines an inner periphery of the orifice 86. With this configuration, as the flexible body 60 axially elongates and contracts (e.g., its internal volume 80 changes) as illustrated in FIGS. 6 and 7, the radial distance between the surfaces 82 and 84 and the tapered portion 94 may respectively increase and decrease. Therefore, as fuel pressure within the bellows increases, an area of the orifice 86 may also increase. Conversely, as the fuel pressure within the bellows decreases, the area of the orifice 86 may also decrease.

The pintle 62 of FIG. 3 also includes a conical head 96 at the distal end 88. This head 96 tapers from the distal end 88 to or towards the tapered portion 94. The head 96 is configured to redirect fuel flowing axially through the orifice 86 at least partially radially outward. In this manner, fuel may be sprayed over a relatively large area. In addition, the head 96 may promote fuel atomization by providing an impact surface for breaking apart relatively large fuel droplets.

The seal assembly 64 may include an outer seal ring 98 and an inner seal ring 100. The outer seal ring 98 (e.g., an electrolytic carbon ring) is configured to provide a setback and buffer between the nozzle member 78 and a side panel 102 of the trailing edge box 50. The outer seal ring 98 has a substantially annular body that extends along the axis 66. An inner bore 99 of the outer seal ring 98 receives the head 96 and fluidly couples the orifice 86 with an orifice 101 in the side panel 102. The inner bore 99 also receives a portion of the inner seal ring 100, which extends along the axis 66 out from and may be connected to (e.g., formed integral with or attached to) the nozzle member 78. This inner seal ring 100 seals a gap between the nozzle member 78 and the outer seal ring 98, and facilitates axial movement of the nozzle member 78 and, thus, expansion and contraction of the variable volume member 76; e.g., the bellows.

During engine operation, varying conditions and/or fuel demand may cause fuel pressure within the manifold 44 and the fuel conduits 54 to fluctuate; i.e., increase and decrease. When the fuel pressure is relatively low, the flexible body 60 may axially contract (see FIG. 6). This contraction may cause the nozzle member 78 to move towards the base 58 and relative to the pintle 62 and its tapered portion 94, which is axially fixed. As the nozzle member 78 moves towards the base 58, the area of the orifice 86 decreases causing the fuel to flow quicker through the orifice 86 and thereby substantially maintaining a relatively large fuel spray pattern. Conversely, when the fuel pressure is relatively high, the flexible body 60 may axially expand (see FIG. 7). This expansion may cause the nozzle member 78 to move away from the base 58 and relative to the tapered portion 94. As the nozzle member 78 moves away the base 58, the area of the orifice 86 increases allowing additional fuel to flow through the orifice 86 while still maintaining a relatively large fuel spray pattern. In this manner, the variable orifice jet 56 is configured to generally maintain an optimum spray pattern generally independent of fuel pressure within the fuel delivery system 40.

It is worth noting, the self-contained configuration of the variable orifice jet 56 may reduce manufacturing, assembly and maintenance costs and time. For example, the variable orifice jets 56 may be tested and provided with a desired setting before the jets 56 are attached to the spray bars 42; e.g., the pintle 62 may be screwed into or out of the mounting ring 93 to respectively increase or decrease the size of the orifice 86. Installing and replacing the variable orifice jets 56 may also be relatively simple and quick since each jet 56 may simply be screwed into or unscrewed from the fuel conduit sidewall 70.

Figure 11:
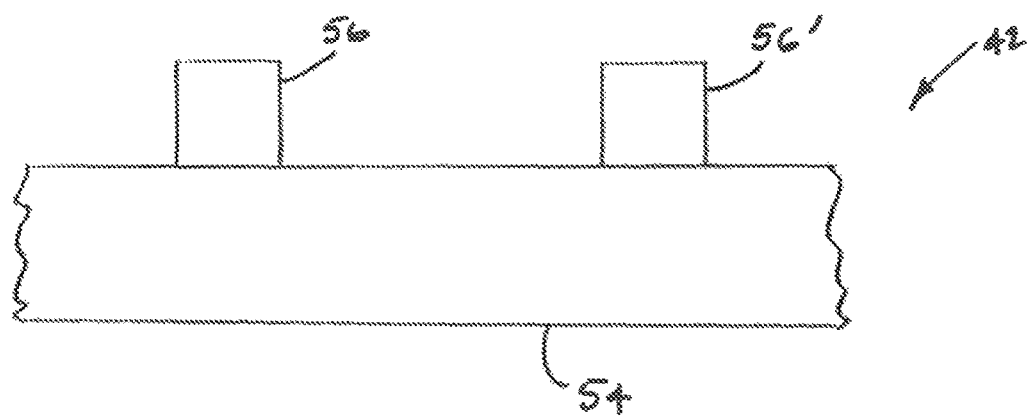
FIG. 11 is a schematic illustration of a portion of still another fuel delivery system.

For ease of description, each of the spray bars 42 is described above as including variable orifice type jets. However, in other embodiments for example as shown in FIG. 11, one or more of the spray bars 42 may each also include one or more fixed orifice jets 56'. The term "fixed orifice jet" may describe a jet with a nozzle orifice having a constant area. Various fixed orifice jet configurations are known in the art and the present disclosure is not limited to any particular ones thereof.

Figure 10:
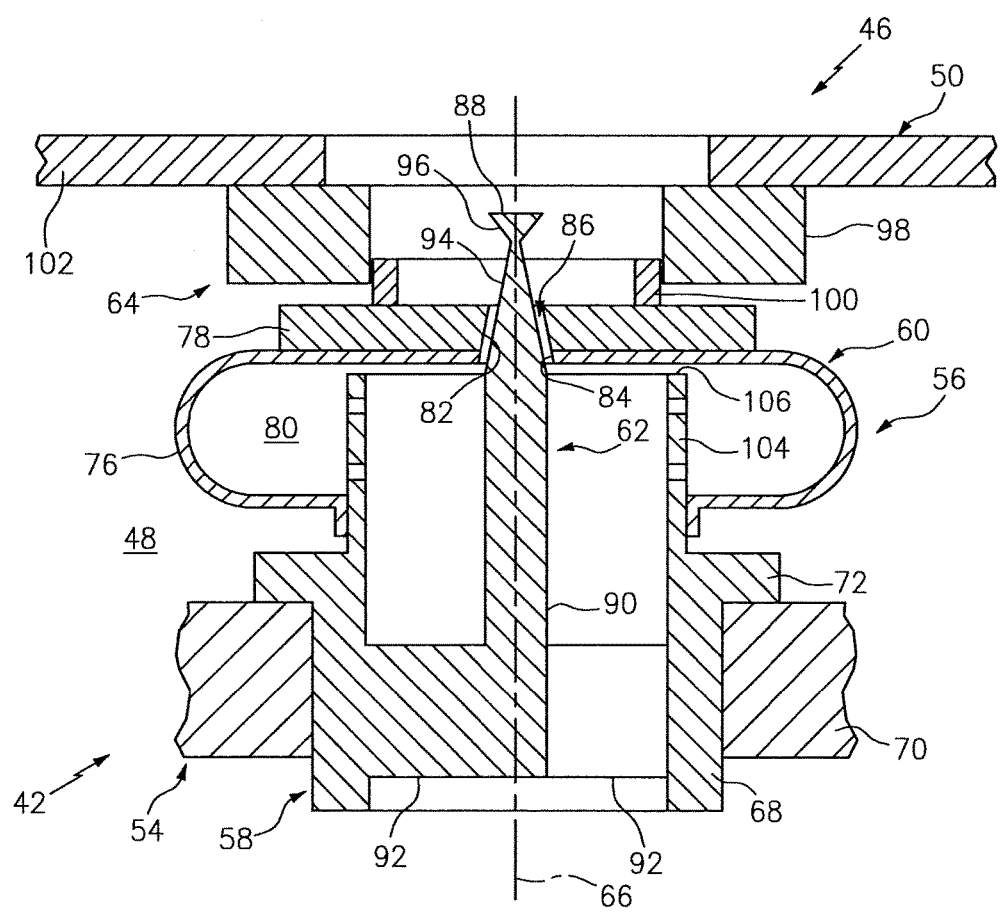
FIG. 10 is a side sectional illustration of a portion of another spray bar and trailing edge box.

In some embodiments, referring to FIG. 10, the base 58 may include a tubular mounting portion 104 that extends along the axis 66 out from the grip portion 72. A distal end 106 of the mounting portion 104 may provide a stop (or limiter) for axial movement of the flexible body 60. In this manner, the distal end 106 may maintain the orifice 86 with a minimum area to ensure flow of fuel even where the fuel pressure is relatively low; e.g., the distal end 106 may prevent axial collapse of the bellows. In addition, the mounting portion 104 may be perforated or porous to reduce or prevent a fuel pressure gradient within the internal volume 80.

The flexible body 60 may be bonded (e.g., braised) to the mounting portion 104. This enables the flexible body 60 to be axially moved, before bonding, relative to the distal end 106 and thereby dial the jet 56 into a desired setting. In such an embodiment, the pintle 62 may be fixedly attached or formed integral with the struts 92.

Figure 9:
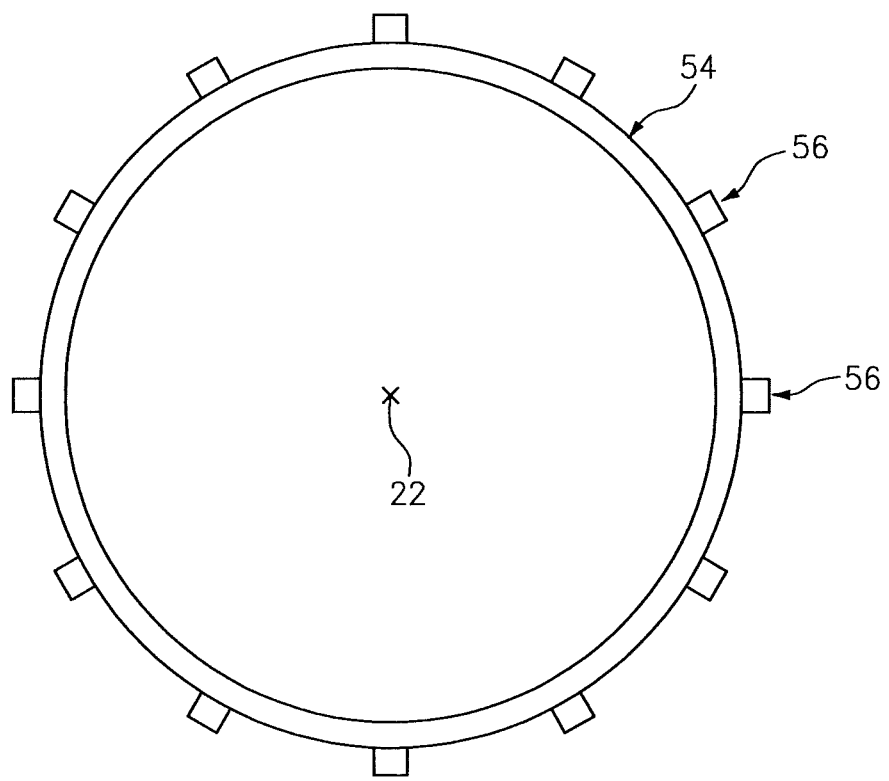
FIG. 9 is a schematic illustration of another fuel delivery system.

In some embodiments, the fuel conduit 54 may be substantially straight and/or extend radially relative to the centerline 22 of the turbine engine 20 as illustrated in FIG. 2. In other embodiments, the fuel conduit 54 may extend circumferentially at least partially about the centerline 22 of the turbine engine 20 as illustrated in FIG. 9; e.g., the fuel conduit 54 may be configured into a ring.

Referring to FIG. 1, the fuel delivery system 40 may be configured for the augmentor section 32 as described above. Alternatively, the fuel delivery system 40 and/or one or more of its components including the fuel conduit 54 may be configured for the combustor section 30. For example, each variable orifice jet 56 may be arranged to inject fuel into the combustion chamber 38 through a respective orifice in a combustor wall or bulkhead.

The terms "upstream", "downstream", "inner" and "outer" are used to orientate the components of the fuel delivery system 40 described above relative to the turbine engine 20 and its centerline 22. A person of skill in the art will recognize, however, one or more of these components may be utilized in other orientations than those described above. The present invention therefore is not limited to any particular fuel delivery system 40 spatial orientations.

The fuel delivery system 40 may be included in various turbine engines other than the one described above. The fuel delivery system 40, for example, may be included in a geared turbine engine where a gear train connects one or more shafts to one or more rotors in a fan section, a compressor section and/or any other engine section. Alternatively, the fuel delivery system 40 may be included in a turbine engine configured without a gear train. The fuel delivery system 40 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A fuel delivery system for a turbine engine, comprising:
   a spray bar fuel conduit;
   a variable orifice jet configured to spray fuel received from the fuel conduit, the variable orifice jet including a flexible body and a pintle that extends through a sidewall of the flexible body, wherein an area of an orifice between the sidewall and the pintle is variable;
   the flexible body comprising a variable volume member and a nozzle member, the variable volume member configured with an internal volume that changes based on fuel pressure within the variable volume member, and the pintle extending through nozzle member; and
   a seal assembly comprising an outer seal ring and an inner seal ring connected to the nozzle member, a portion of the inner seal ring received within an inner bore of the outer seal ring, the inner seal ring operable to slide within the inner bore of the outer seal ring and seal a gap between the nozzle member and the outer seal ring and to facilitate axial movement of the nozzle member.

2. The system of claim 1, wherein the variable orifice jet is configured to change the area of the orifice as fuel pressure within the flexible body changes.

3. The system of claim 1, wherein the variable orifice jet is configured to increase the area of the orifice as fuel pressure within the flexible body increases.

4. The system of claim 1, wherein a portion of the pintle extending through the nozzle member is tapered towards a distal end of the pintle.

5. The system of claim 4, wherein the pintle includes a head at the distal end, and the head is configured to redirect fuel flowing axially through the orifice at least partially radially outward.

6. The system of claim 4, wherein an annular surface of the sidewall forming an outer periphery of the orifice tapers towards the distal end of the pintle.

7. The system of claim 1, wherein the variable volume member comprises a single chamber bellows.

8. The system of claim 1, wherein the variable volume member comprises a multi-chamber bellows.

9. The system of claim 1, wherein the flexible body is generally tubular and substantially co-axial with the pintle.

10. The system of claim 1, further comprising a second variable orifice jet configured to spray fuel received from the fuel conduit.

11. The system of claim 1, further comprising a fixed orifice jet configured to spray fuel received from the fuel conduit.

12. The system of claim 1, further comprising an augmentor vane, wherein the fuel conduit and the variable orifice jet are configured with the augmentor vane.

13. A fuel delivery system for a turbine engine, comprising:
a fuel conduit;
a variable orifice jet attached to and fluidly coupled with the fuel conduit, the variable orifice jet including a pintle and a flexible body with a bellows;
wherein the pintle extends through a sidewall of the flexible body, and an area of an orifice between the sidewall and the pintle is variable; and
a seal assembly comprising an outer seal ring and an inner seal ring, connected to the flexible body, a portion of the inner seal ring received within an inner bore of the outer seal ring, the inner seal ring receiving a distal end of the pintle, and the inner ring configured to slide within the inner bore of the outer seal ring and to seal a gap between the flexible body and the outer seal ring and to facilitate axial movement of the sidewall adjacent the pintle.

14. The system of claim 13, wherein the variable orifice jet is configured to change the area of the orifice as fuel pressure within the bellows changes.

15. The system of claim 13, wherein the fuel conduit extends radially relative to a centerline of the turbine engine.

16. The system of claim 13, wherein the fuel conduit extends circumferentially at least partially about a centerline of the turbine engine.

17. The system of claim 13, wherein a portion of the pintle extending through the sidewall is tapered towards a distal end of the pintle.

18. The system of claim 13, wherein the bellows comprises a single chamber bellows.

19. The system of claim 13, wherein the bellows comprises a multi-chamber bellows.

20. The system of claim 13, wherein the flexible body is generally tubular and substantially co-axial with the pintle.

* * * * *